Figure 1:
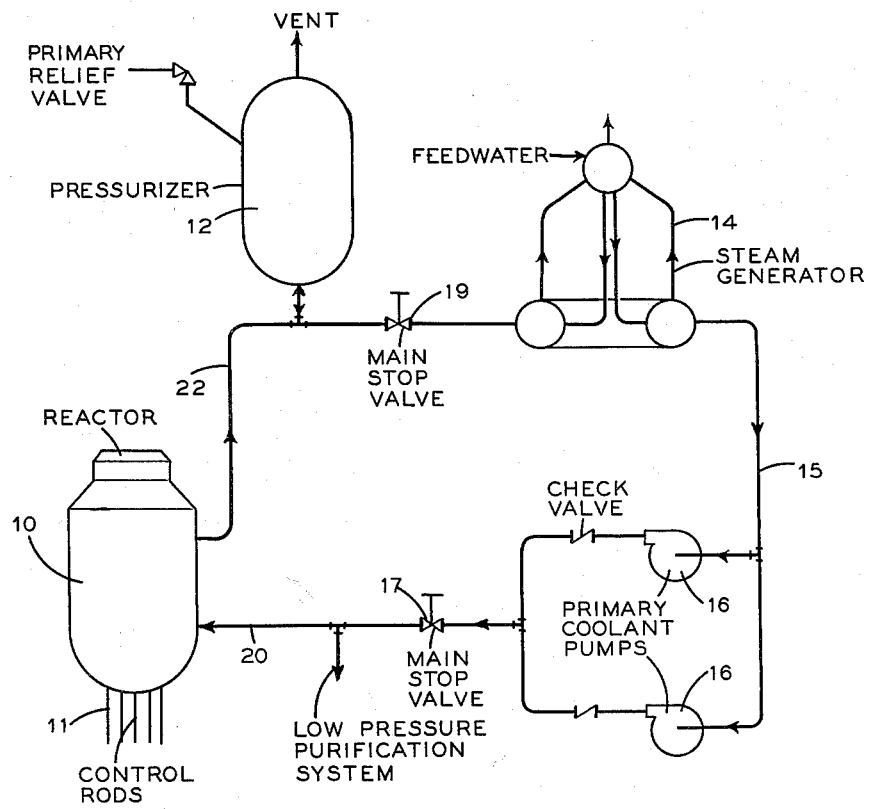

INVENTOR.
Bernard A. Mong

Sept. 10, 1963     B. A. MONG     3,103,477
NUCLEAR REACTOR

Filed Dec. 2, 1958     5 Sheets-Sheet 4

INVENTOR.
Bernard A. Mong
BY
ATTORNEY

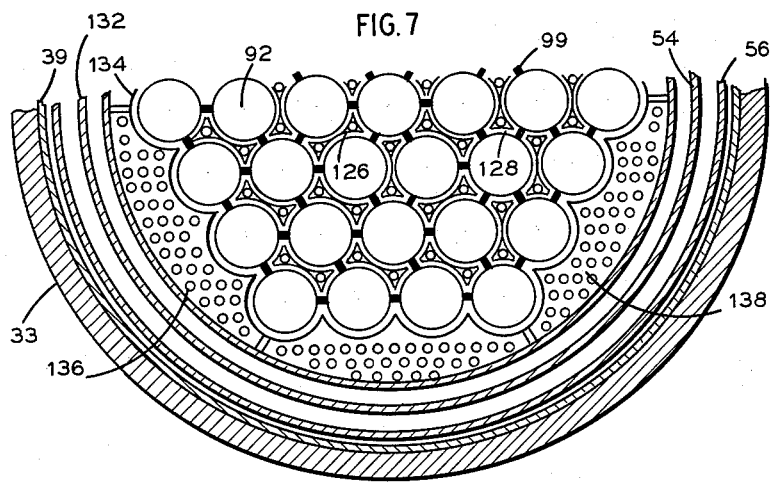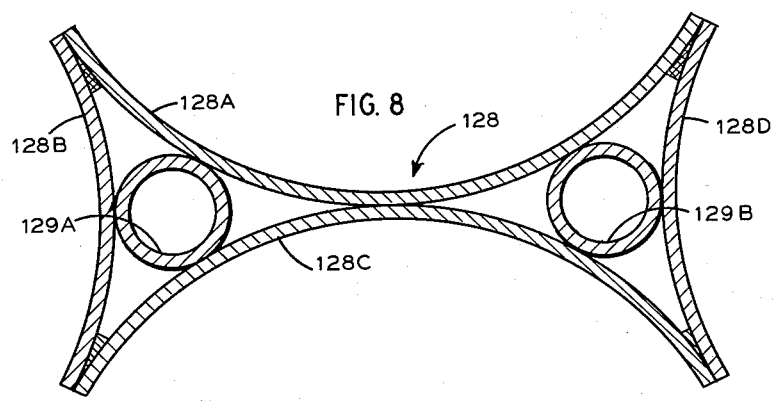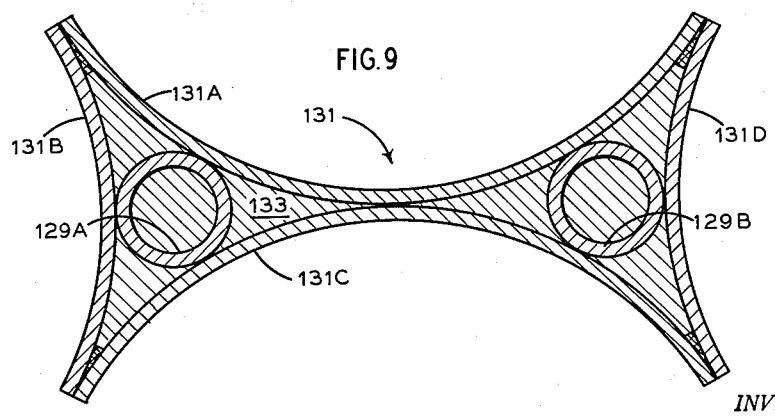

United States Patent Office 3,103,477
Patented Sept. 10, 1963

3,103,477
NUCLEAR REACTOR
Bernard A. Mong, Lynchburg, Va., assignor to The Babcock & Wilcox Company, New York, N.Y., a corporation of New Jersey
Filed Dec. 2, 1958, Ser. No. 777,682
6 Claims. (Cl. 204—193.2)

This invention relates in general to nuclear reactors wherein a controlled fission chain reaction takes place, and more particularly, it relates to an internal converter type nuclear reactor wherein some fissionable material is created by the conversion of a fertile material in the presence of a neutron flux.

In a nuclear reactor a neutron fissionable isotope such as $U^{233}$, $U^{235}$, and $Pu^{239}$, or mixtures thereof, is fissioned by absorption of neutrons and a self-sustaining chain reaction may be established by the neutrons evolved from the fission if the mass of fissionable material is made sufficiently large. Specific details of the theory and essential characteristics of such reactors are set forth in Patent No. 2,708,656, issued to Enrico Fermi et al. on May 17, 1955.

An internal converter reactor, as used in this invention, is one wherein a fertile material contained within the reactor core is converted to a fissionable material by exposure to reactor generated neutrons where the quantity of fissionable material converted is less than the fissionable material which is consumed during a given period of operation of a fission chain reaction. An example of a fertile material which is convertible to a fissionable material is thorium which upon neutron capture is ultimately transformed to $U^{233}$. Specific details and characteristics of this transformation are set forth in Patent No. 2,798,847, issued to Enrico Fermi et al. on July 9, 1957.

Accordingly, the present invention provides a new fuel element assembly which is stronger and more versatile in use. Such fuel element assembly being made of a multiplicity of fuel containing components arranged on uniform circumferential rows and with the rows uniformly spaced within a right circular cylinder.

Further, the invention provides a nuclear reactor arrangement wherein a cylindrically shaped core is formed by placing a number of the cylindrical fuel assemblies closely spaced on a triangular pitch.

Additionally, control rods of a double biconcave shape are provided to substantially fill the spaces between the fuel assemblies.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which a certain specific embodiment of the invention is illustrated and described.

Figure 2:
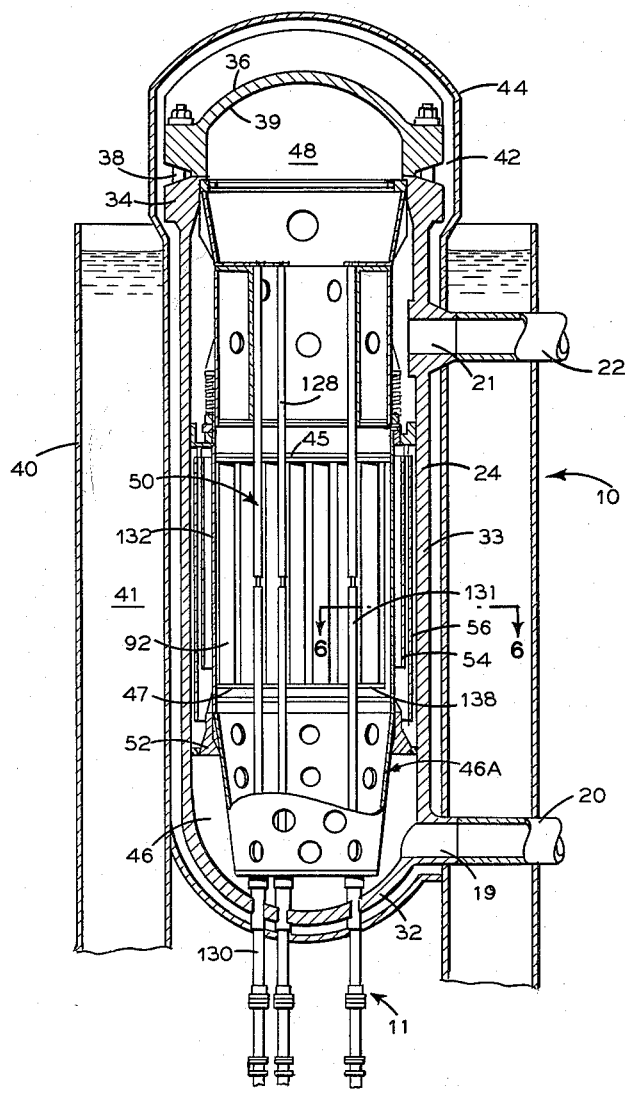
Figure 3:
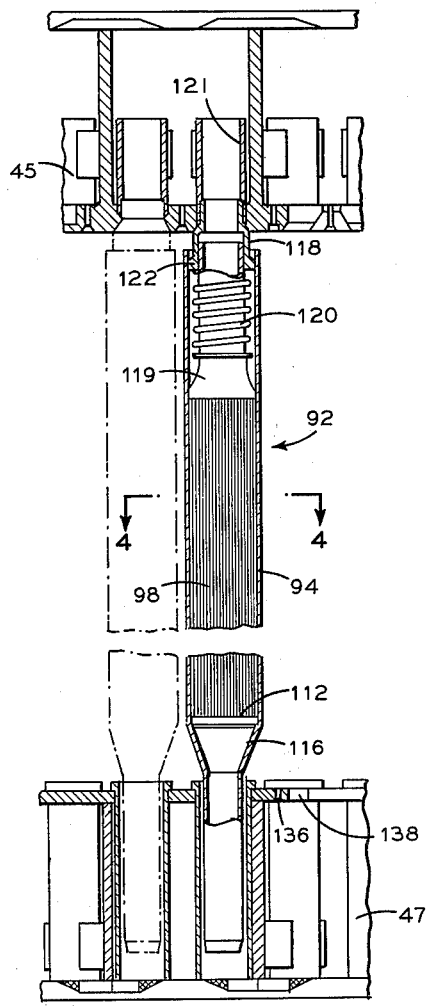
Figure 4:
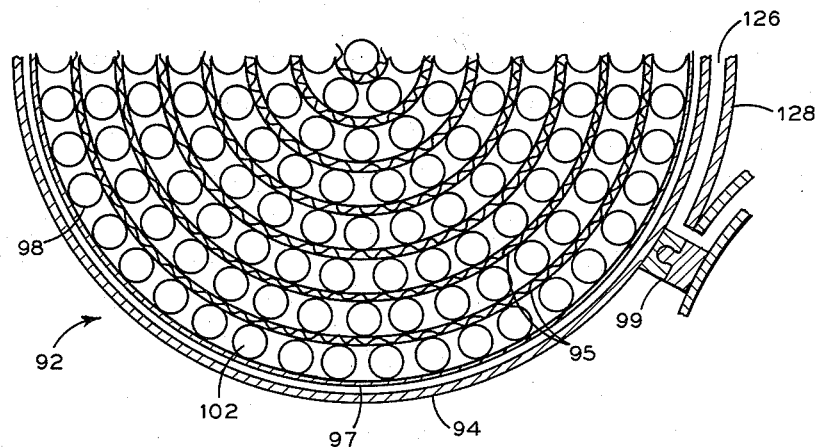
Figure 5:
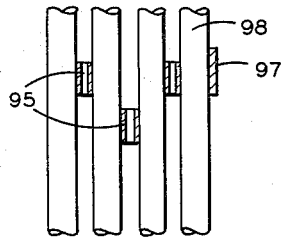
Figure 6:
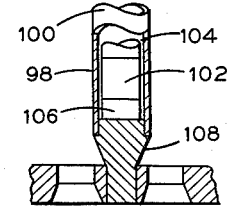

Of the drawings:
FIG. 1 is a schematic diagram showing the reactor of the invention within a heat transfer system.
FIG. 2 is a vertical section through the reactor of the invention;
FIG. 3 is an enlarged scale partial vertical section showing the arrangement of the fuel element assemblies within the reactor of FIG. 1;
FIG. 4 is a greatly enlarged plan section taken along the line 4—4 of FIG. 3;
FIG. 5 is a partial side view of the fuel assembly of FIG. 3;
FIG. 6 is a partial enlarged section of a fuel pin and connection of the fuel element assembly of FIG. 3;
FIG. 7 is a greatly enlarged one-half plan section of the reactor vessel taken along the lines 6—6 of FIG. 2;
FIG. 8 is a plan section through a typical control rod; and
FIG. 9 is a plan section through the control rod follower.

In FIG. 1 there is shown the nuclear reactor of the present invention located in a heat transfer system for the generation of steam to be used in the production of electrical power. The system comprises a reactor 10 wherein heat is generated by a controlled chain type fission reactor and having bottom mounted control rods 11, a pressurizer 12, a steam generator 14 and primary coolant pumps 16. The reactor 10 receives pressurized water at a pressure of 1500 p.s.i. and 481 F. which has been taken from the steam generator 14 via lines 15, 20 by the primary coolant pumps 16. The primary coolant liquid flows through the reactor in heat transfer relationship with the fuel contained therein and is heated to 510 F. The heated water then leaves the reactor and flows through the line 22 to the steam generator 14 which is a type as described in the applicant's assignee's copending applicaion Serial No. 428,038 of D. K. Davies et al., filed May 6, 1954, now Patent No. 2,904,013, dated September 19, 1959. The primary coolant passes through the steam generator 14 in indirect heat transfer relationship with the boiling water therein during which passage it transfers the heat received by it in the passage through the reactor. The steam generator produces saturated steam at 405 p.s.i. The cooled primary coolant then flows through the line 15 to the coolant pumps 16 to complete the cycle.

The pressurizer 12 is an electrically heated boiler operating at 1500 p.s.i. and connected to the primary coolant system by a small line through which pressure is transmitted thereto.

Specific details of the theory and construction of the pressurizer 14 are set forth in the applicant's assignee's copending application of Donald F. Judd, Serial No. 715,432 filed February 4, 1958. Though the diagram in FIG. 1 sets forth only one primary coolant loop it is understood that a number of loops may be connected to the reactor and that the number in use as primary coolant loops may be varied as required, by closing the main stop valves 17, 19 arranged in the lines 20, and 22.

An important requirement of a nuclear reactor used in the commercial generation of electrical power is that the reactor core have an extended operating lifetime. An example of a core with an extended operating lifetime would be one having at least a lifetime of approximately 600 full power days. In such a core it is necessary to provide an excess mass of fissionable material in addition to that required to sustain a fission chain reaction in a cold clean core, i.e. a reactor core in which a chain reaction has not been established at or near room temperature. The excess mass of fissionable material is required to provide reactivity for temperature rise, build-up of neutron absorbing fission products, burnout of fuel and other miscellaneous reaction poisoning effects. To control the excess reactivity present within the reactor core, a control system is required.

The control system for the reactor in the present invention comprises a system of bottom mounted control rods 11. The bottom mounted control rods are disposed within the reactor so that they may be adjustably positioned within the core. Control rod drive mechanisms are provided to position the control rods, either electro-mechanical or hydraulic systems or the combination of both, may be used as the drive mechanisms, examples of which are illustrated and described in U.S. Patents Nos. 2,735,811, 2,708,656, 2,756,857, and 2,798,847. The control rod material, a substance which will absorb neutrons without reproducing them, may be selected from a group including hafnium, boron stainless steel or an alloy of cadmium-indium and silver. An automatic control system (not shown) comprising a pressure sensor, programmer, demand comparator and servocontrol actuates the control rod drive mechanism.

In FIG. 2 there is shown a preferred embodiment of the nuclear reactor 10 used in the generation of steam. The nuclear reactor 10 comprises a vertically elongated pressure vessel 33 of circular cross section which is connected to the primary coolant inlet line 20 at the nozzle 19 and to the outlet coolant line 22 at the nozzle 21. The vessel has a hemispherically shaped end 32 and wall of increased cross section forming upper flange 34. A plurality of threaded studs 38 are arranged to connect a head member 36 to the flange 34 of the pressure vessel in a pressure tight joint. Both pressure vessel and the head member are formed of carbon steel plate with a thin stainless steel cladding 39 (see FIG. 7) on the inner faces thereof. A vertically disposed annular shaped neutron shield tank 40 is formed about the major portion of the pressure vessel and covers the central portion thereof. A body of light water 41 is maintained in the tank 40 to provide a lateral neutron shield for the reactor. A layer of stainless steel wool insulation is placed in the space 42 between a closely fitting can 44 and the walls 33 of the pressure vessel to reduce the heat loss from the reactor to the neutron shield tank 40.

The pressure vessel is generally divided by transversely arranged upper and lower grid plate assemblies 45, 47, respectively, to form in conjunction with the wall 33, end 32 and head 36 three zones. These zones are, a lower plenum chamber 46, an upper plenum chamber 48, and core chamber 50 disposed between the upper and lower grid plate assemblies.

The reactor internals contained within the pressure vessel 33 are divided into two classifications, first, permanent reactor internals which are integrally attached to the pressure vessel, and second, removable reactor internals.

The permanent reactor internals comprise a vertically disposed frusto-conically shaped support skirt 52 which provides the main support for the removable reactor internals and walls forming vertically extending concentrically arranged and radially spaced open ended cylinders 54, 56 which provide a pair of permanent thermal shields within the core chamber 50.

The removable reactor internals consist of a lower plenum chamber assembly 46A arranged within the lower plenum chamber 46, an upper plenum chamber assembly arranged within the upper plenum chamber 48 and a core disposed within the core chamber 50 between the upper and lower grid plate assemblies 45, 47.

A multiplicity of elongated, longitudinally contiguous fuel element assemblies 92 (see FIGS. 3 and 4) of heterogeneous form are geometrically arranged as a core to undergo a controlled chain type fission reaction. The fuel element assembly 92 comprises longitudinally elongated exterior walls 94 of circular cross section arranged to form an open-ended flow chamber therewithin. The walls 94 forming the flow chamber are composed of Zircaloy-2, a material capable of withstanding the high temperatures generated by the chain type fission reaction within the reactor core and having a low absorption cross section for thermal neutrons. The walls 94 forming the exterior surface of the fuel element assemblies are approximately 10½ inches in diameter.

A large number of cylindrically shaped fuel containing components or pins 98 are arranged within and parallel to the longitudinal axis of the walls 94 of the flow chamber. The fuel pins 98 are an open-ended, cylindrically shaped stainless steel tube 100. Arranged therein (FIG. 6) is a column of cylindrically shaped fuel pellets 102 stacked end to end. The fuel pellets 102 are a mixture of fully enriched uranium oxide ($UO_2$) and thoria ($ThO_2$) which has been compressed and sintered to yield a high density and machined to a close dimensional tolerance. An enriched uranium oxide is one in which the abundance of the $U^{235}$ isotope is increased above the amount normally contained therein. A fully enriched uranium oxide is one that contains more than 90 percent of the $U^{235}$ isotope. The fuel pellets diameter is sufficiently smaller than the interior diameter of the fuel pin tube 100 to provide an annular space 104 between the tube 100 and the fuel pellet 102. An inert insulating pellet 106 of magnesium oxide or alumina is placed at each end of the column of fuel pellets. End plugs 108 are welded to the fuel pin tubes 100 to form a seal therefor. The insulating pellet 106 between the fuel pellets and the end plug serves to reduce the temperature gradient between the tube and end plug, thereby reducing the stresses caused by differential expansion. The distance between the interior faces of the end plugs 108 within the tube 100 is greater than the height of the column of pellets 102, 106 to allow for the assembly and differential expansion of the pellets. A heat transfer medium, such as helium, lead, or sodium, is placed within the tube 100 to fill the voids and to reduce the temperature gradient across the voids caused by the spaces.

The fuel rods or pins 98 are not limited to the fuel or pellet fabrication described above but can be used equally well with low enriched uranium oxide $UO_2$. Also the fuel rods or pins 98 can be fabricated by swaging the fuel powders within the tubing to a high density followed by a sintering heat treatment within the tubes.

The fuel pins 98 are spaced and supported on one end of the fuel element by a tube support and flow distribution plate 112 (see FIG. 3). The fuel pins are arranged in a radial and circumferential pitch, each circular ring of fuel pins is a multiple of 6. As an example, the first ring contains 6 pins, the second 12 etc. For any fuel pin size or metal to coolant ratio that is chosen the circumferential pitch of the fuel pins will be $\pi/3$ times the radial pitch. The radial and circumferential pitch will not differ greatly.

The fuel pins are spaced both radially and circumferentially at intervals along their length with a series of short hollow ring spacers 95 brazed to the fuel pins 98. This allows the coolant flow to pass around and through the spacers 95 which may be placed on the same plane or staggered as indicated in FIG. 5. The ring spacers and fuel pins cooperate to form fuel pin bundles having a cross section which substantially fills the cross section of the flow chamber within the walls 94. The bundles are held together within the flow chamber by circumferential bands 97 which are secured to the outer row of pins at vertically spaced positions thereof.

Each fuel element assembly has an inlet nozzle extension 116 secured at one end of the flow chamber walls 94 (FIG. 3). The nozzle extension 116 is of circular cross section arranged to be engaged in the lower grid plate assembly 47.

The upper end of each assembly 92 has an outlet nozzle extension adapter 118 secured within the upper end of the flow chamber walls 94. The outlet nozzle extension adapter 118 comprises an interior transition sleeve 119, a spring 120 and an exterior nozzle extension 121. The exterior nozzle extension has a circular cross section and is removably attached to the flow chamber walls by means of a bayonet lock 122 and extends longitudinally and co-axially from the flow chamber walls 94. The interior transition sleeve 119 is resiliently held in place and at one end is slidably engaged within the exterior nozzle adaptor 118 and on the other end bears on the fuel pin assembly. The spring 120 is arranged about the outlet channel portion of the interior transition sleeve 119 to maintain the fuel pin bundles in position and against the exterior nozzle extension on the other end to spring load the bayonet lock. The exterior nozzle extension 121 is engaged within the upper grid plate assembly 45 and is also resiliently maintained in position by the spring 120. The outlet nozzle extension adapter 118 is arranged so that it may be easily removed for remote refueling of the fuel element assemblies. Additionally, the spring loaded outlet nozzle extension adapter 118 provides a hold down against the hydraulic forces of the flowing coolant and allows for differential expansion between the fuel pin bundles and the flow chamber walls 94.

As may be seen in FIG. 4 each fuel element assembly 92 is connected to an adjacent assembly by slip connection 99. This connection allows vertical movement between assemblies as caused by temperature or hydraulic forces while giving lateral restraint.

Control rods 128 and fuel elements 92 are arranged in a symmetrical pattern to form the reactor core which has the generally cylindrical shape of the reactor pressure vessel wall 33.

FIGURE 7 shows one of many possible core arrangements and consists of 37 fuel element assemblies. FIG. 7 is one-half section where the half not shown is exactly as the half shown.

Control rods 128 of bow-tie or double biconcave shaped cross section (FIG. 8) are hollow for passage of coolant flow. This hollow construction serves a very important functional effect, that is, increased neutron absorption. The coolant within the rod tends to peak the neutron flux in this area making the rods more effective. The control rods are movably positioned within the core control rod channels 126 which are formed by the fuel element containers 94. The control rods are formed of four arcuate plates 128A, 128B, 128C, 128D, concavely arranged to conform to the radius of the fuel element containers which are fastened together at the four corners and internally supported by two tubes 129A, 129B. Each tube is tangentially contacted by three plates. The active length of the control rods is approximately equal to the active length of the fuel elements. The control rods as set forth above are formed of materials having a high neutron absorption cross section.

One arrangement of a power core shown in FIG. 7 contains 27 control rods. The control rods can be oriented in the core in a variety of patterns. The control rods 128 are positioned within the core by means of a control rod drive mechanism (not shown) external of the reactor 10. A control rod drive shaft passes through each control rod nozzle extension 130 in the base 32 of the reactor vessel and drives a follower rod 131 which is in turn connected to the control rod 128. The follower rod 131 (FIG. 9) has the same external shape and size as the control rod 128 and is fabricated from low neutron absorbing material. The follower rod is made of four bent plates 131A, 131B, 131C, 131D of Zircaloy-2 fabricated around the tubes 129A and 129B. The hollow internal space between the plates and inside the tubes is filled with a low neutron absorbing material 133 such as aluminum metal, aluminum oxide, beryllium metal or beryllium oxide. As the control rod is withdrawn from the core it travels upwardly into the upper plenum chamber 48 and its position within the core is taken by the follower rod 131. The follower rod 131 is provided to prevent the formation of large coolant flow spaces through the core when the control rods 128 are withdrawn. The control rod drive mechanism, not shown, is a fail safe type so that if there is a failure of the control rod drive mechanism system the control rod 128 will fall into the core and scram the reactor.

A removable thermal shield 132 arranged as vertically extending stainless steel walls forms an open ended right circular cylinder disposed about the core. The removable thermal shield 132 extends above and below a pair of spaced imaginary horizontal planes which define the upper and lower limits of the active fuel region of the core. A core shroud 134 (FIG. 7) is arranged about the core within the removable thermal shield 132. The core shroud 134 is formed of vertically arranged curved plates disposed about the outer periphery of the fuel element assemblies 92 joined to form a continuous wall thereabout. The core shroud 134 and the removable thermal shield 132 cooperate to form vertically extending flow passages 136 about the outer boundary of the fuel element assemblies 92 and within the removable thermal shield 132. Horizontally disposed core shroud baffle plates 138 having openings 136 provided therethrough are arranged between the core shroud 134 and the removable thermal shield 132 to limit the flow of primary coolant through the flow passages.

The present invention by providing cylindrical fuel assemblies allows a cylindrical core to be made which utilizes the volume more effectively. This minimizes the amount of metal in the core and gives a more effective control rod pattern.

Moreover, the fuel assembly of the present invention is strong because of its geometrical form. It is simpler to manufacture and can be made to closer tolerances.

The fuel element can be made to accommodate any fuel component per size and pitch spacing to therefore allow a wide variance in the metal to water ratio.

The control rods being hollow are most effective from a nuclear standpoint while being light and strong.

While in accordance with the provisions of the statutes, I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of the other features.

What is claimed is:

1. In a nuclear reactor a nuclear fuel element assembly comprising an elongated cylindrical shell, a multiplicity of elongated fuel containing components substantially filling the interior of said shell and arranged longitudinally on uniform spacings in circumferential rows and with the rows uniformly radially spaced, a plurality of said fuel element assemblies arranged in parallel on a closely spaced triangular pitch to form a generally cylindrically shaped core having a multiplicity of biconcave spaces between the cylindrical fuel assemblies and sufficient fissionable material to sustain a chain reaction, and high neutron absorbing control rods disposed in and adapted to substantially fill the biconcave spaces between each four adjacent fuel element assemblies, each control rod having a cross section formed by double and opposing biconcave surfaces.

2. In a nuclear reactor a nuclear fuel element assembly comprising an elongated cylindrical shell, a multiplicity of elongated fuel containing components substantially filling the interior of said shell and arranged longitudinally on uniform spacings in circumferential rows and with the rows uniformly radially spaced, a plurality of said fuel element assemblies arranged in parallel on a closely spaced triangular pitch to form a generally cylindrically shaped core having a multiplicity of biconcave spaces between the cylindrical fuel assemblies and sufficient fissionable material to sustain a chain reaction, and a high neutron absorbing control rod disposed in and adapted to substantially fill each biconcave space between four adjacent fuel element assemblies, each control rod formed by four concave arranged thin arcuate shaped plates joined at their edges and supported on two laterally spaced parallel tubes with each tube tangentially contacted by three of said plates.

3. In a nuclear reactor a nuclear fuel element assembly comprising an elongated cylindrical shell, a multiplicity of elongated fuel containing components substantially filling the interior of said shell and arranged longitudinally on uniform spacings in circumferential rows and with the rows uniformly radially spaced, a plurality of said fuel element assemblies arranged in parallel on a closely spaced triangular pitch to form a generally cylindrically shaped core having a multiplicity of biconcave spaces between the cylindrical fuel assemblies and sufficient fissionable material to sustain a chain reaction, high neutron absorbing control rods disposed in and adapted to substantially fill the biconcave spaces between said fuel element assemblies, each control rod having a cross section formed by double and opposing biconcave surfaces, and a follower rod connected vertically adjacent to one end of and having the same cross-sectional shape as each control rod, the follower rod being of a solid cross section and formed of a material having a low cross section for absorption of thermal neutrons.

4. In a nuclear reactor a nuclear fuel element assembly comprising an elongated cylindrical shell, a multiplicity of elongated fuel containing components substantially filling the interior of said shell and arranged longitudinally on uniform spacings in circumferential rows and with the rows uniformly radially spaced, a plurality of said fuel element assemblies arranged in parallel on a closely spaced triangular pitch to form a generally cylindrically shaped core having a multiplicity of biconcave spaces between the cylindrical fuel assemblies and sufficient fissionable material to sustain a chain reaction, a high neutron absorbing control rod disposed in and adapted to substantially fill each biconcave space between four adjacent fuel element assemblies, each control rod formed by four concave arranged thin arcuate shaped plates joined at their edges and supported on two laterally spaced parallel tubes with each tube tangentially contacted by three of said plates, and a follower rod connected vertically adjacent to one end of and having the same cross sectional shape as each control rod, the follower rod being of a solid cross section and formed of a material having a low cross section for absorption of thermal neutrons, said follower rod being formed on extensions of the pair of tubes which support the control rods.

5. A nuclear fuel element assembly arranged for the flow of a coolant therethrough comprising an elongated cylindrical shell, a multiplicity of longitudinally extending fuel containing components disposed within and substantially filling the interior of said shell, said components uniformly spaced and positioned in a number of concentrically arranged radially spaced circumferential rows, ring shaped spacers disposed along the length of said fuel element assembly and positioned between and contacting the components in adjacent circumferential rows, said spacers formed of a hollow built-up construction to permit flow of coolant through the spacers.

6. In a nuclear reactor a nuclear fuel element assembly comprising an elongated cylindrical shell, a multiplicity of longitudinally extending fuel containing components disposed within and substantially filling the interior of said shell, said components uniformly spaced and positioned in a number of concentrically arranged radially spaced circumferential rows, a plurality of said fuel element assemblies arranged in parallel on a closely spaced triangular pitch to form a generally cylindrically shaped core having a multiplicity of biconcave spaces between adjacent fuel assemblies, means for connecting adjacent fuel element assemblies to provide lateral restraint and to permit relative vertical movement, and high neutron absorbing control rods disposed in and adapted to substantially fill the biconcave spaces bounded by said fuel element assembly connecting means and said fuel element assemblies.

References Cited in the file of this patent

UNITED STATES PATENTS

| | | |
|---|---|---|
| 2,848,404 | Treshow | Aug. 19, 1958 |
| 2,870,076 | Koch | Jan. 20, 1959 |
| 2,873,242 | Treshow | Feb. 10, 1959 |
| 2,879,216 | Hurwitz et al. | Mar. 24, 1959 |
| 2,920,025 | Anderson | Jan. 5, 1960 |

OTHER REFERENCES

Proceedings of the International Conference on the Peaceful Uses of Atomic Energy, Aug. 8–20, 1955, vol. 3, pages 60, 159, 160, 161, 299, 300.